United States Patent Office.

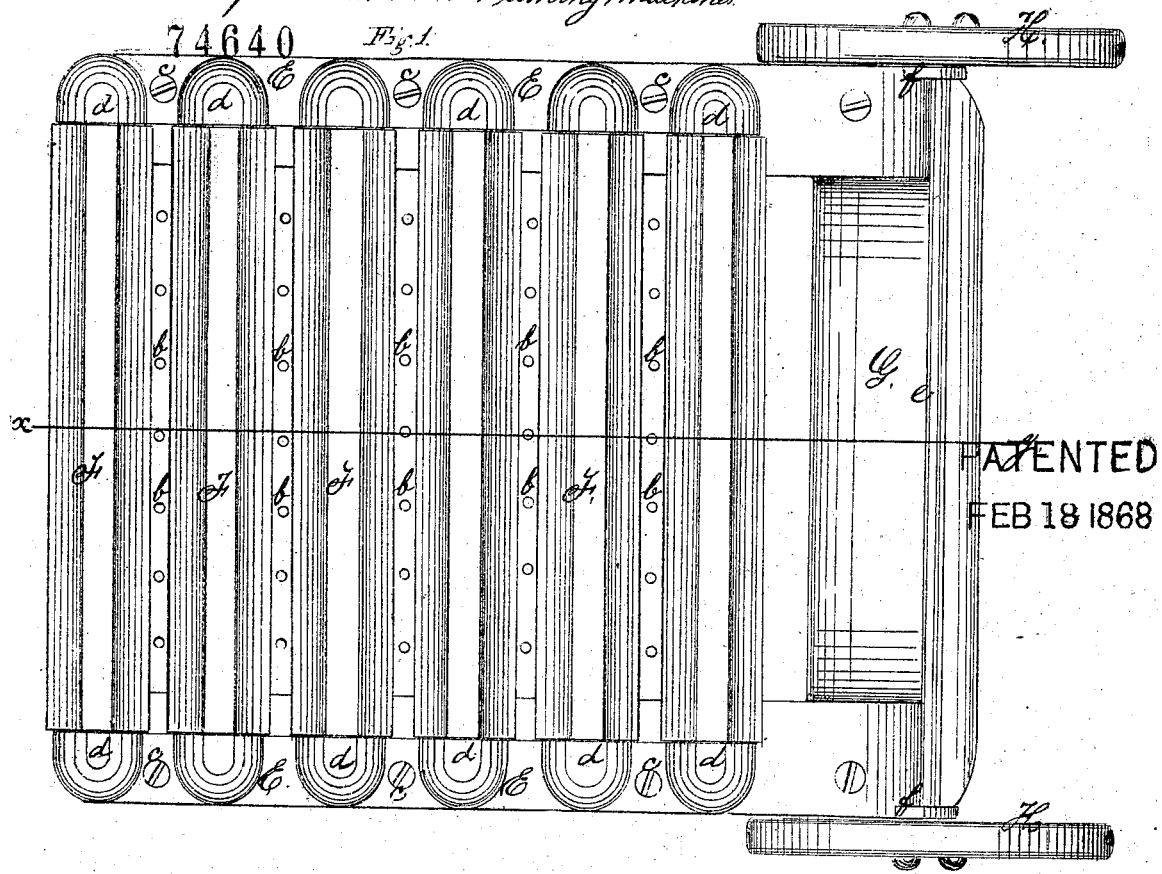
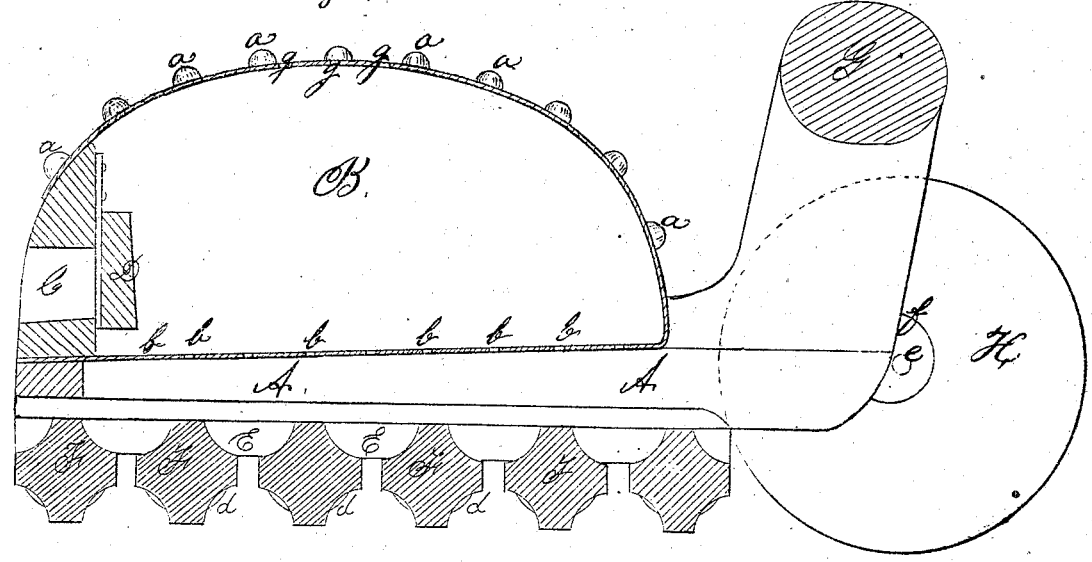

CHARLES E. WAHLGREN, OF KNOXVILLE, ILLINOIS.

Letters Patent No. 74,640, dated February 18, 1868.

---

IMPROVED WASHING-MACHINE.

---

*The Schedule referred to in these Letters Patent and making part of the same.*

---

TO ALL WHOM IT MAY CONCERN:

Be it known that I, CHARLES E. WAHLGREN, of Knoxville, in the county of Knox, and State of Illinois, have invented a new and useful Improvement in Washing-Machines; and I do hereby declare that the following is a full, clear, and exact description of the construction and operation of the same, reference being had to the accompanying drawings, making a part of this specification, in which—

Figure 1 is a bottom view of the machine.

Figure 2 is a longitudinal section of the same, as indicated by the line taken in the plane $x\,y$ of fig. 1.

Like letters in both figures of the drawings indicate like parts.

The nature of my invention consists, first, in the construction of a wash-board with a reservoir having a perforated bottom, and providing said reservoir with a valve, so that the machine may be dipped in the suds instead of the clothes, which will fill the reservoir through the valve, and be retained a sufficient length of time therein, until the machine is lifted on to the clothes, and when rubbed over the same, a strong and beautiful lather will be produced by the passage of the suds through the perforations, which will cleanse the clothes in the most perfect manner; second, the combination of wheels and axle, or a roller, with the reservoir, to serve as guides for preventing the clothes from rolling up under the machine, and also for protecting the same from injury in its backward movement.

To enable any one skilled in the art to make and use my invention, I will proceed to describe its construction and operation.

The drawings represent a full-size working machine, with the exception of the wheels, which will be made a little stronger. A is the frame of the machine. B is the reservoir, made of a semicircular shape, of tin. The sides and front are made of wood. The tin is first secured to the under edges of the front and sides, and then bent over on the upper edges of the sides, and fastened thereto, and across the front, by screws or tacks $a\,a$. The reservoir is then suitably secured to the frame of the machine. The front is provided with an elongated slot, C, of a suitable size, having a valve, D, on the inside of the reservoir, for closing and opening the same. $b\,b$ are the perforations made across the bottom of the reservoir. E E are metallic plates, secured to the frame of the machine by screws $c\,c$, and provided with sockets $d\,d$, to receive the ends of the fluted ribs F F, which revolve freely therein when machine is operated upon. G is the handle, suitably secured to the top of the frame, at the rear end thereof. H H are the wheels, properly secured to the ends of the axle $e$. The axle is held by plates $f\,f$, secured to the sides of the frame. The holes in the plates through which the axle passes being made large enough for the axle to turn therein. The axle may be made fast, and the wheels turn thereon, whichever deemed best.

I do not desire to limit myself to the axle and wheels, as I contemplate using a roller in lieu of the same, if I find it more desirable. In the top of the reservoir are air-vents $g\,g$.

Operation: The machine is dipped in the suds instead of the clothes; the valve opening, the reservoir becomes filled with the suds, and as soon as the machine is lifted out of the same, the valve closing, the suds in the reservoir will be retained a sufficient length of time until the machine is placed on the clothes, when it is rubbed over the same, producing a strong and beautiful lather by the passage of the suds through the perforations, thus cleansing the clothes in the most perfect manner. The wheels serve as guides for the purpose, as hereinbefore indicated. The machine may be used on a plain or common wash-board. The operator holds the clothes in place with one hand, and operates the machine with the other.

Having thus fully described my invention, what I claim therein as new, and desire to secure by Letters Patent, is—

1. The reservoir B, in combination with the fluted ribs or rollers F of a washing-board or machine, substantially as herein described.

2. The wheels H H, or their equivalent, in combination with the reservoir B and fluted ribs or rollers F, substantially as herein described.

CHAS. E. WAHLGREN.

Witnesses:
R. L. HANNAMAN,
G. W. KRETZINGER.